US012812394B2

(12) United States Patent
Patil et al.

(10) Patent No.: US 12,812,394 B2
(45) Date of Patent: Nov. 24, 2026

(54) CO-EXISTENCE CONDITION INFORMATION VIA RESPONSE MESSAGE

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US); Sai Yiu Duncan Ho, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 18/489,821

(22) Filed: Oct. 18, 2023

(65) Prior Publication Data

US 2025/0133412 A1 Apr. 24, 2025

(51) Int. Cl.
*H04W 16/14* (2009.01)
*H04L 5/00* (2006.01)

(52) U.S. Cl.
CPC ........... *H04W 16/14* (2013.01); *H04L 5/0053* (2013.01)

(58) Field of Classification Search
CPC ............................. H04W 16/14; H04L 5/0053
See application file for complete search history.

(56) References Cited

U.S. PATENT DOCUMENTS 9,226,102 B1 * 12/2015 Singh .................... H04L 1/1628
11,317,370 B1 * 4/2022 Choi ..................... G01S 7/0235
2013/0203418 A1 8/2013 Jang et al.
2015/0382364 A1 12/2015 Sharma
2016/0198361 A1 7/2016 Sun et al.
2017/0094575 A1 * 3/2017 Bercovici ........... H04L 65/1094

FOREIGN PATENT DOCUMENTS

WO WO-2012150677 A1 11/2012
WO WO-2013168361 A1 11/2013

OTHER PUBLICATIONS

International Search Report and Written Opinion—PCT/US2024/047032—ISA/EPO—Dec. 23, 2024 (2400205WO).

* cited by examiner

*Primary Examiner* — Saad A. Waqas
(74) *Attorney, Agent, or Firm* — Norton Rose Fulbright US LLP

(57) ABSTRACT

This disclosure provides methods, components, devices and systems for providing information with respect to co-existence conditions. Some aspects more specifically relate to providing co-existence condition information via response messages. In some examples, co-existence condition information provided via a response message may indicate that a wireless communication device is experiencing a co-existence condition, may include information regarding the co-existence condition, or a combination thereof. Response messages utilized in carrying co-existence condition information may include messages made in response to a message from a peer wireless communication device via an existing or otherwise prior established messaging channel established for messaging of information other than co-existence condition information.

24 Claims, 8 Drawing Sheets

CO-EXISTENCE CONDITION INFORMATION VIA RESPONSE MESSAGE

TECHNICAL FIELD

This disclosure relates generally to wireless communication, and more specifically, to providing co-existence condition information via response messages.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, a wireless communication device (for example, an AP, a STA, or a combination thereof) may perform simultaneous wireless communications for multiple communication sessions. In an example, a wireless communication device may utilize multiple wireless communication transmit/receive (Tx/Rx) chains operable to perform multiple communication sessions simultaneously. A wireless communication device implementing WLAN communications according to a Wi-Fi protocol may, for example, simultaneously perform communications according to one or more cellular, ZIGBEE, THREAD, BLUETOOTH, etc. protocols. The simultaneous communication sessions may utilize a same frequency band (for example, the communications each being in a same one of the 2.4 GHZ, 5 GHZ, 6 GHz or 60 GHZ bands) or may otherwise utilize frequencies that result in interference being experienced internally (in-device) to the wireless communication device by any or all of the multiple wireless communication Tx/Rx chains. In some scenarios, although not operating in a same or overlapping frequency band, the a wireless communication technology may implement local oscillator frequencies for processing signals of a respective communication session which are harmonics of, and cause interference to, signals of another communication session as processed by its respective wireless communication Tx/Rx chain.

One or more components of a wireless communication device experiencing in-device interference resulting from simultaneous communication sessions is referred to herein as a co-existence condition. Interference of a co-existence condition often degrades wireless performance by one or more of multiple wireless communication Tx/Rx chains. For example, Wi-Fi WLAN communications may experience message failures, such as may result in increased message retries. Such interference of a co-existence condition is inconsistent with one of the express goals of next generation Wi-Fi (also referred to as Ultra High Reliability (UHR), Wi-Fi 8, or IEEE 802.11bn), which is to improve reliability.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for wireless communication. The apparatus for wireless communication includes a processing system that includes one or more processors and one or more memories coupled with the one or more processors. According to some aspects, the processing system is configured to cause the apparatus perform a first communication session with a wireless communication device and one or more second communication sessions in which a co-existence condition is experienced. The co-existence condition may be associated with interference at the apparatus, the interference being experienced due to the first communication session and the one or more second communication sessions. According to some aspects, the processing system is also configured to cause the apparatus to obtain a first message from the wireless communication device. According to some aspects, the processing system is further configured to cause the apparatus to output, for transmission, a second message responsive to the first message. The second message may carry information regarding the co-existence condition.

Another innovative aspect of the subject matter described in this disclosure can be implemented in an apparatus for wireless communication. The apparatus for wireless communication includes a processing system that includes one or more processors and one or more memories coupled with the one or more processors. According to some aspects, the processing system is configured to cause the apparatus to output a first message for transmission to a wireless communication device. According to some aspects, the processing system is configured to also cause the apparatus to obtain a second message responsive to the first message. The second message may carry information regarding a co-existence condition experienced by the wireless communication device. The co-existence condition may be associated with interference at the wireless communication device, the interference being experienced due to a first communication session and one or more second communication sessions performed by the wireless communication device. According to some aspects, the processing system is configured to further cause the apparatus to alter one or more aspects of a transmission associated with the first communication session based on the information regarding the co-existence condition.

Another innovative aspect of the subject matter described in this disclosure can be implemented in a method performable at a first wireless communication device. According to some aspects, the method includes performing a first communication session with a second wireless communication device and one or more second communication sessions in which a co-existence condition is experienced. The co-existence condition may be associated with interference at the first wireless communication device, the interference being experienced due to the first communication session and the one or more second communication sessions.

According to some aspects, the method also includes obtaining a first message from the second wireless communication device. According to some aspects, the method further includes outputting, for transmission, a second message responsive to the first message, wherein the second message carries information regarding the co-existence condition.

Another innovative aspect of the subject matter described in this disclosure can be implemented in a method performable at a first wireless communication device. According to some aspects, the method includes outputting a first message for transmission to a second wireless communication device.

According to some aspects, the method also includes obtaining a second message responsive to the first message. The second message may carry information regarding a co-existence condition experienced by the second wireless communication device. The co-existence condition may be associated with interference at the second wireless communication device, the interference being experienced due to a first communication session and one or more second communication sessions performed by the second wireless communication device. According to some aspects, the method further includes altering one or more aspects of a transmission associated with the first communication session based on the information regarding the co-existence condition.

In some examples, the information regarding the co-existence condition may indicate that the apparatus is experiencing the co-existence condition and may further indicate whether the apparatus is able to obtain one or more additional packets from the wireless communication device while experiencing the co-existence condition.

In some examples, the information regarding the co-existence condition may include information with respect to one or more parameters to be used by the wireless communication device for communicating with the apparatus.

In some examples, the second message may include an acknowledgment message carrying the information regarding the co-existence condition.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
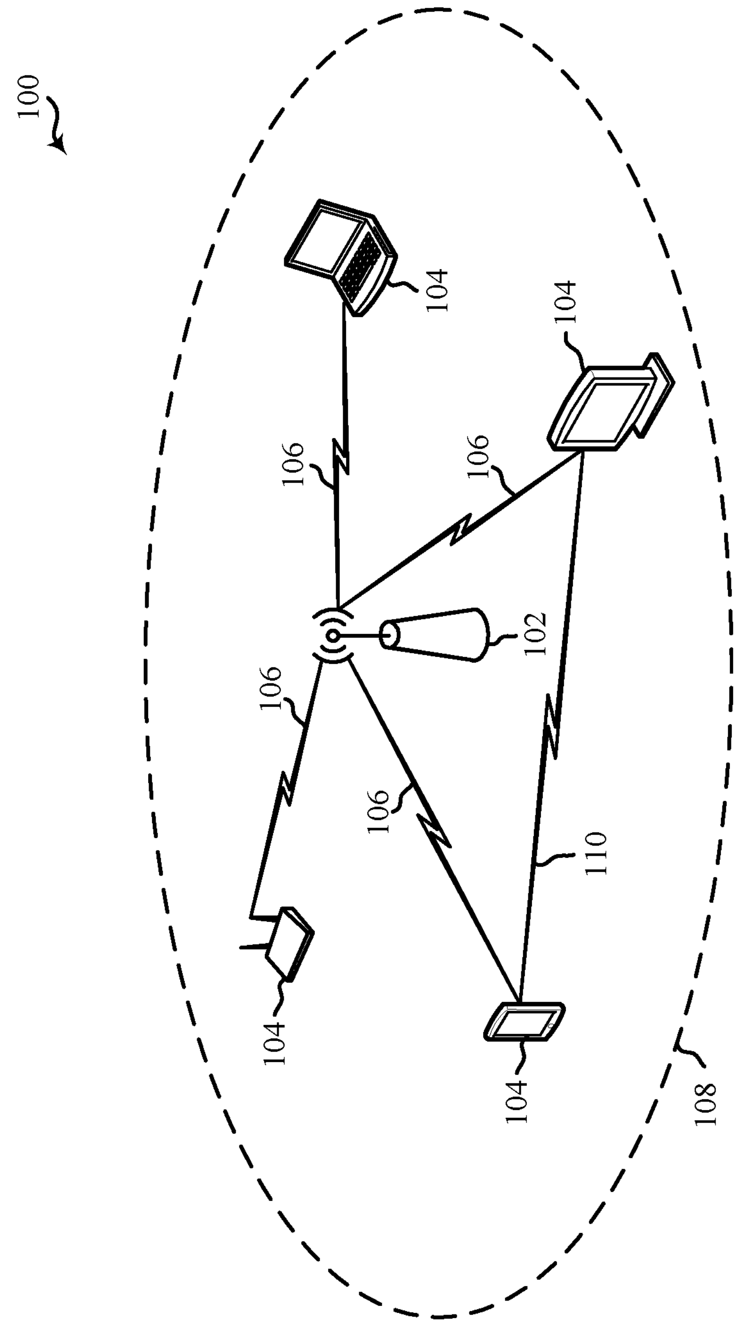
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless communication, and more specifically, to providing information with respect to co-existence conditions. Some aspects more specifically relate to providing co-existence condition information via response messages that are in response to one or more messages from a second wireless communication device. Response messages utilized in carrying co-existence condition information according to some aspects include messages made in response to a message from a peer wireless communication device via an existing or otherwise prior established messaging channel established for messaging of information other than co-existence condition information. Such a response message may be leveraged to facilitate feedback regarding a co-existence condition experienced by a wireless communication device according to aspects described herein. According to some aspects, a response to a management message, a data message, a control message, etc. may be utilized to carry information with respect to a co-existence condition. In some examples, an acknowledgement (for example, ACK or NACK) messaging implemented for indicating that data has been received successfully or not may provide a response message be leveraged to facilitate feedback regarding co-existence conditions.

Co-existence condition information provided via a response message may, for example, indicate that a wireless communication device is experiencing a co-existence condition. Additionally or alternatively, co-existence condition information provided via a response message may include information regarding the co-existence condition, such as whether the wireless communication device is able to receive additional data packets while experiencing the co-existence condition, information with respect to one or more parameters (for example, transmit or operational parameters) for transmitting signals of a communication session associated with the co-existence condition, an expected duration of the co-existence condition, etc.

In some examples, a first wireless communication device (for example, a wireless access point (AP), a wireless station (STA), etc.) may experience a co-existence condition in association with performing simultaneous wireless communications of a first communication session and a second communication session using respective ones of multiple wireless communication transmit/receive (Tx/Rx) chains. The first and second communication sessions may be in accordance with a same or different communication protocol (for example, simultaneous communication according one or more of a Wi-Fi, cellular, ZIGBEE, THREAD, BLUETOOTH, etc. protocols). The first wireless communication device may transmit a response message (for example, an acknowledgment message specified for indicating that data has been received successfully or not) carrying information regarding the co-existence condition. As such, a second wireless communication device (for example, a wireless communication device, such as an AP, a STA, etc. that is in communication with the first wireless communication device at least via one of the first and second communication sessions) may receive an indication that the first wireless communication device is experiencing a co-existence condition, information regarding the co-existence condition, or a combination thereof. In response, the second wireless communication device may alter one or more aspects of transmission to the first wireless communication device, such as to mitigate, alleviate, or avoid the co-existence condition. For example, the second wireless communication device may alter one or more parameters for transmission of a signal transmitted to the first wireless communication device based on or otherwise in correspondence with the information regarding the co-existence condition. As another example, the second wireless communication device may pause, stop, or otherwise interrupt transmission of the signal to the first wireless communication device based on or otherwise in correspondence with the information regarding the co-existence condition.

Particular aspects of the subject matter described in this disclosure can be implemented to realize one or more of the following potential advantages. In some examples, by providing co-existence condition information via response messages, the described techniques can be used for a wireless communication device to provide feedback to its peer about an on-going co-existence condition, such as to enable the peer to manage its transmissions to the wireless communication device. By using a response message to a message from a peer wireless communication device to carry co-existence condition information, messaging implemented for another purpose may be leveraged to facilitate feedback regarding co-existence conditions. For example, by using an acknowledgment message as a response message carrying co-existence condition information, messaging implemented for indicating that data has been received successfully may be leveraged to facilitate feedback regarding co-existence conditions.

The use of response messages according to some aspects may provide for co-existence condition feedback using an existing or otherwise prior established messaging channel without the need for separately initiating a channel for co-existence condition information communication between peer wireless communication devices.

Additionally or alternatively, the use of response messages according to some aspects may avoid, mitigate, or minimize the use of control channel or data channel communication for co-existence condition information communication between peer wireless communication devices. According to some aspects, a response message for which a mechanism for protecting information carried therein, such as a multi-station block acknowledgment (Multi-STA BA) for which a mechanism for protecting control frames is expected to be implemented according to the IEEE 802.11bn communication protocol standards, may be used to deliver information regarding co-existence conditions in a secure, trusted manner.

According to some aspects, relatively fast feedback regarding a co-existence condition is provided to a peer wireless communication device by using response messages to indicate a co-existence condition, allowing the peer wireless communication device to relatively quickly adapt its transmissions. Information regarding the co-existence condition included in a response message of some aspects facilitates a peer wireless communication device efficiently and effectively adapting its transmissions for the particular co-existence condition experienced, optimally for remediation of the co-existence condition, etc.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, 802.11bn, and the 802.11 amendment associated with Wi-Fi 8). The WLAN 100 may include numerous wireless communication devices such as a wireless AP 102 and multiple wireless STAs 104*a*. 104*b*, 104*c*, and 104*d* (collectively referred to as STAs 104). While only one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The example illustrated in FIG. 1 shows a handheld device (for example, a mobile phone, PDA, etc.) configuration of STA 104*a*, a display device (for example, a TV, computer monitor, navigation system, etc.) configuration of STA 104*b*, a computing device (for example, a netbook, notebook computer, tablet computer, laptop, chromebook, etc.) configuration of STA 104*c*, and a network communication node (for example, a router, a switch, a repeater, a device configured for wireless communication with other networks, etc.) configuration of STA 104*d*. It is to be understood that the illustrated configurations of STAs 104 are provided as examples and are not limiting with respect to the various configurations of STAs as may comprise wireless communication devices operable in accordance with aspects of the present disclosure. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110, as represented by communication link 110 between STA 104*a* and 104*b*. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHZ bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHZ, 5 GHZ or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and then contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some examples, the wireless communication device may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (for example, identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (for example, identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK), and best effort (AC_BE). This enables particular types of traffic to be prioritized in the network.

Retransmission protocols, such as hybrid automatic repeat request (HARQ), may offer performance gains. A HARQ protocol may support various HARQ signaling between transmitting and receiving wireless communication devices as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (for example, a negative acknowledgement (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an ARQ protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. A MLO-capable device may be referred to as a multi-link device (MLD). For example, an AP MLD may include multiple affiliated APs each configured to communicate on a respective communication link with a respective one of multiple STAs of a non-AP MLD (also referred to as a "STA MLD"). The STA MLD may communicate with the AP MLD over one or more of the multiple communication links at a given time. A STA MLD may include multiple affiliated STAs each configured to communicate on a respective communication link with a respective one of multiple STAs, a respective one of multiple APs, or a combination thereof.

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

In operation according to some aspects, wireless communication devices of WLAN 100 (for example, one or more APs 102, one or more STAs 104, or a combination thereof) may perform simultaneous wireless communications for multiple communication sessions. For example, one or more wireless communication devices of WLAN 100 may comprise MLDs (for example, AP MLDs or STA MLDs described above) performing MLO supporting simultaneous communication sessions. By way of example, an AP MLD configuration of a wireless communication device may perform simultaneous communication sessions with one or more other wireless communication devices (for example, one or more AP, one or more STA, or a combination thereof) of WLAN 100. According to one example scenario, an AP MLD may perform simultaneous communication sessions with a plurality of STAs, such as for supporting multiple access operation, for facilitating communication between the STAs, for facilitating media casting by one of the STAs to another STA, etc. According to another example scenario, an AP MLD may perform simultaneous communication sessions with one or more AP and one or more STA, such as for supporting mesh network operation, for backhaul communication, etc. According to yet another example scenario, a STA MLD may perform simultaneous communication sessions with a plurality of STAs, such as for performing various functionality with the other STAs (for example, media casting to an STA, obtaining sensor data, etc.), for facilitating a personal area network (PAN), for facilitating communication between the other STAs, etc. According to still yet another example scenario, a STA MLD may perform simultaneous communication sessions with one or more AP and one or more STA, such as for performing various functionality with another STAs (for example, media casting to an STA, obtaining sensor data, etc.), for supporting mesh network operation, etc. Pairs of wireless communication devices in communication with each other via a communication session of simultaneous communication sessions, such as in the examples of the above scenarios, are referred to herein as peer devices.

Figure 2:
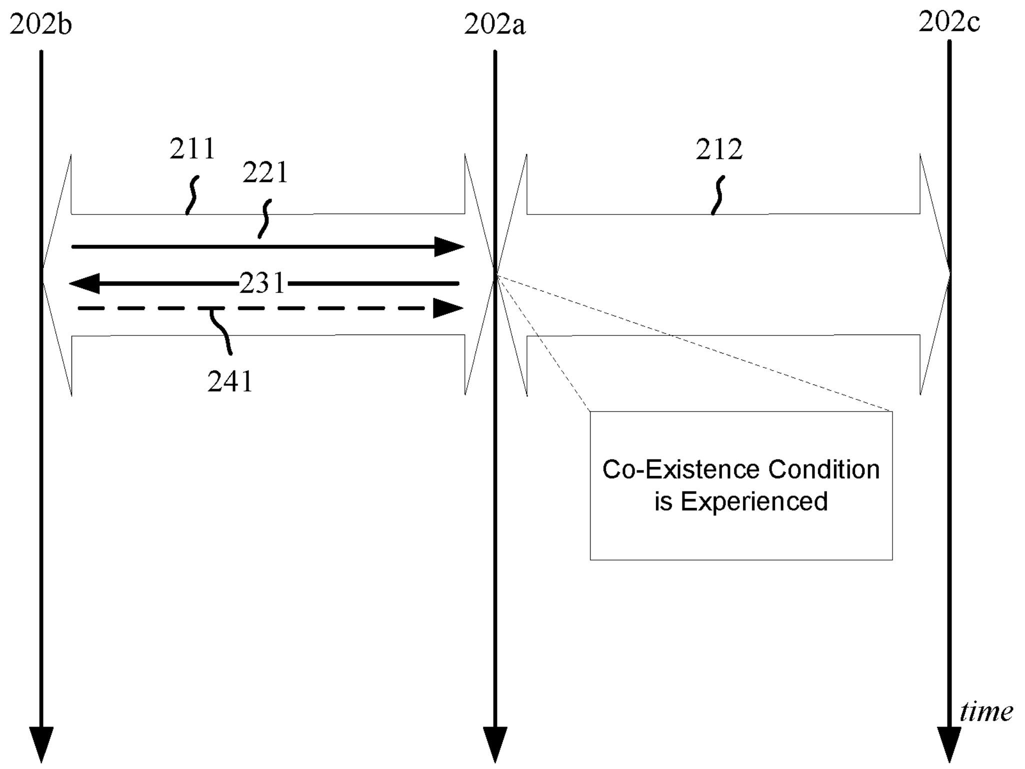
FIG. 2 shows a diagram illustrating a wireless communication device performing simultaneous wireless communications for multiple communication sessions.

FIG. 2 shows a diagram illustrating a wireless communication device performing simultaneous wireless communications for multiple communication sessions. In the example of FIG. 2, wireless communication device 202*a* is performing a first communication session (shown as communication session 211) with wireless communication device 202*b* and is also performing a second communication session (shown as communication session 212) with wireless communication device 202*c*. Wireless communication devices 202*a*, 202*b*, and 202*c* may, for example, comprise wireless communication devices of WLAN 100, such as one or more APs 102, one or more STAs 104, or a combination thereof. Wireless communication devices 202*a* and 202*b* in communication via communication session 211 may be referred to as a pair of peer communication devices. Similarly, wireless communication devices 202*a* and 202*c* in communication via communication session 212 may be referred to as a pair of peer communication devices.

Communication sessions 211 and 212 may be performed in accordance with a same or different communication protocol. For example, communication session 211 may be performed in accordance with a Wi-Fi, cellular, ZIGBEE, THREAD, or BLUETOOTH, protocol whereas communication session 212 may be performed in accordance with a same or different one of these protocols. In accordance with a specific example, communication session 211 may be performed between wireless communication device 202*a* (for example, a user computing device operating as a STA within WLAN 100) and 202*b* (for example, an AP operating to provide a BSA of WLAN 100) in accordance with a Wi-Fi protocol while communication session 212 may be performed between wireless communication device 202*a* and 202*c* (for example, a smartwatch operating in a PAN with the user computing device) in accordance with a BLUETOOTH protocol. In another specific example, communication session 211 may be performed between wireless communication device 202*a* (for example, a user computing device operating as a STA within WLAN 100) and 202*b* (for example, an AP operating to provide a BSA of WLAN 100) in accordance with a Wi-Fi protocol while communication session 212 may be performed between wireless communication device 202*a* and 202*c* (for example, a cellular network base station) in accordance with a cellular protocol. In yet another specific example, communication session 211 may be performed between wireless communication device 202*a* (for example, an AP operating to provide a BSA of WLAN 100) and 202*b* (for example, a first STA operating in the BSA) in accordance with a Wi-Fi protocol while communication session 212 may be performed between wireless communication device 202*a* and 202*c* (for example, a second STA operating in the BSA) in accordance with a Wi-Fi protocol. It is to be understood that the foregoing are provided as examples to aid in understanding concepts presented in the present disclosure and are not exhaustive of, or limiting with respect to, the number and types of communication sessions that may be performed or the wireless communication devices between which communication sessions are performed.

Communication sessions 211 and 212 are performed simultaneously in that one or more aspects to the communications sessions are performed by a component or components of a wireless communication device (for example, components of multiple Tx/Rx chains implemented by wireless communication device 202*a*) during a same or overlapping period of time. For example, wireless communication device 202*a* may transmit, receive, or a combination thereof a signal of communication session 211 at a same time as transmitting, receiving, or a combination thereof a signal of communication session 212. As another example, one or more components of wireless communication device 202*a* (for example, components of a Tx/Rx chain operated for communications of communication session 211) may operate to process signals of communication session 211 at a same time as one or more other components of wireless communication device 202*a* (for example, components of a Tx/Rx chain operated for communications of communication session 212) may operate to process signals of communication session 212.

In operation according to some aspects, communication sessions 211 and 212 may utilize a same frequency band (for example, the communications each being in a same one of the 2.4 GHZ, 5 GHZ, 6 GHz or 60 GHz bands) or may otherwise utilize frequencies that result in interference being experienced internally (in-device) to wireless communication device 202*a*. According to some aspects, wireless communication device 202*a* may implement local oscillator frequencies for processing signals of communication session 211, communication session 212, or both which are harmonics of, and cause interference to, signals of another communication session (for example, the other one of communication session 211 or communication session 212). Accordingly, wireless communication device 202*a* may experience a co-existence condition in association with performing communication sessions 211 and 212, as indicated in FIG. 2. For example, simultaneous wireless communications of communication session 211 using a first Tx/Rx chain and communication session 212 using a second Tx/Rx chain may result in one or more instances of wireless communication device 202*a* experiencing in-device interference due to communication sessions 211 and 212 performed by wireless communication device 202*a*.

Wireless communication device 202*a* may operate to provide information with respect to co-existence conditions to one or more peer wireless communication devices (for example, either or both of wireless communication devices 202*b* and 202*c*). In the example of FIG. 2, wireless communication device 202*a* provides information regarding a co-existence condition to wireless communication device 202*b* via message 231 that is transmitted in response to one or more messages (for example, message 221) from wireless communication device 202*b*. Message 231 may, for example, carry an indication that wireless communication device 202*a* is experiencing a co-existence condition, co-existence condition information, or a combination thereof.

According to some aspects, message 221 may be transmitted by wireless communication device 202*b* to wireless communication device 202*a* as part of communication session 211 for a purpose other than soliciting co-existence condition information from wireless communication device 202*a*. For example, message 221 may include a control message, data message, or combination thereof, such as for providing control in accordance with a communication protocol of communication session 211, for providing data to a data sink of wireless communication device 202*a*, a wireless communication device (for example, wireless communication device 202*c*) in communication with wireless communication device 202*a*, or a combination thereof, etc. Accordingly, message 231 utilized in carrying information regarding a co-existence condition according to some aspects is a message made in response to message 221 (for example, a management message, a data message, a control message, etc.) from wireless communication device 202*b* via an existing or otherwise prior established messaging channel established for messaging of information other than co-existence condition information. By way of example, message 231 carrying information regarding a co-existence condition according to some aspects may include an acknowledgment message implemented for indicating that data has been received successfully or has not been received successfully (for example, ACK or NACK) from wireless communication device 202*b* by wireless communication device 202*a*. Such an acknowledgment message, such as may traditionally only provide information about the successful reception of MAC protocol data units (MPDUs) carried in a PPDU, may be utilized to carry information regarding a co-existence condition in operation according to some examples.

In operation according to some aspects, wireless communication device 202*b* may receive message 231 carrying an indication that wireless communication device 202*a* is experiencing a co-existence condition, co-existence condition information, or a combination thereof. In response, wireless communication device 202*b* may alter one or more aspects of transmission to wireless communication device 202*a*, such as to mitigate, alleviate, or avoid the co-existence condition. For example, wireless communication device 202*b* may alter one or more parameters for transmission of a signal carrying message 241 (for example, a message of communication session 211 transmitted subsequent to the co-existence condition experienced by wireless communication device 202*a*) based on or otherwise in correspondence with the information regarding the co-existence condition carried in message 231. As another example, wireless communication device 202*b* may pause, stop, or otherwise interrupt transmission of signals (for example, signals of communication session 211 for some period of time) to wireless communication device 202*a* based on or otherwise in correspondence with the information regarding the co-existence condition.

Figure 3:
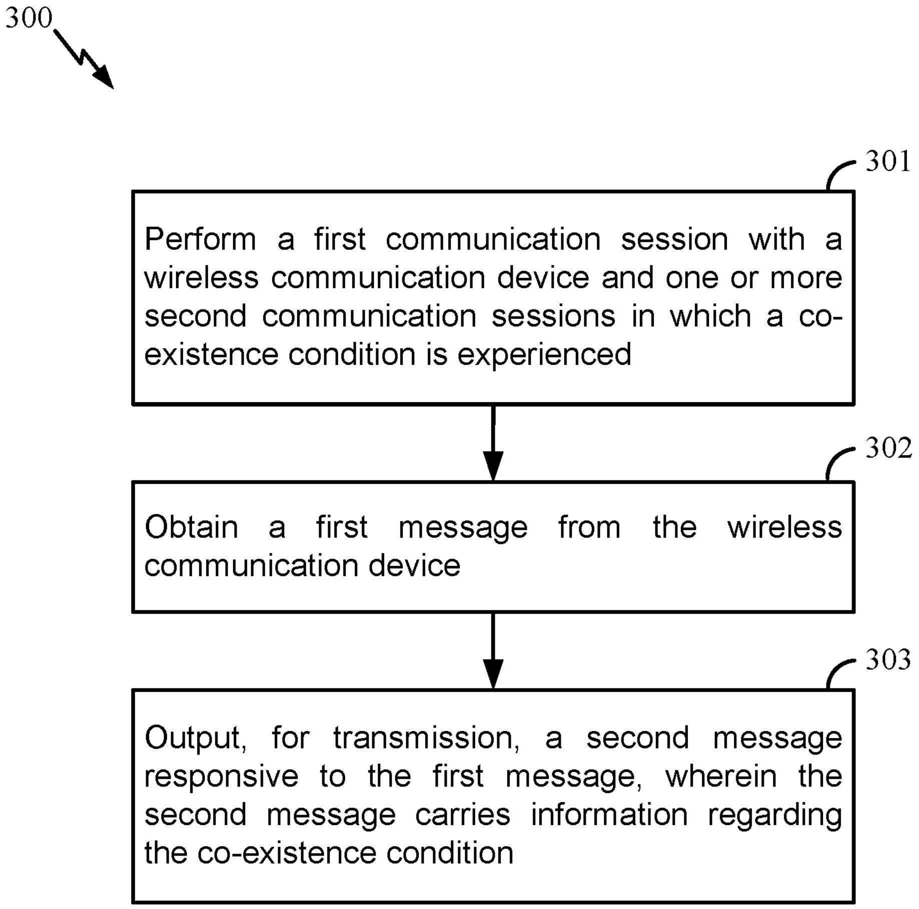
FIG. 3 shows a flowchart illustrating an example process performable at a wireless communication device, at which a co-existence condition is experienced, that supports providing co-existence condition information via response messages.
Figure 4:
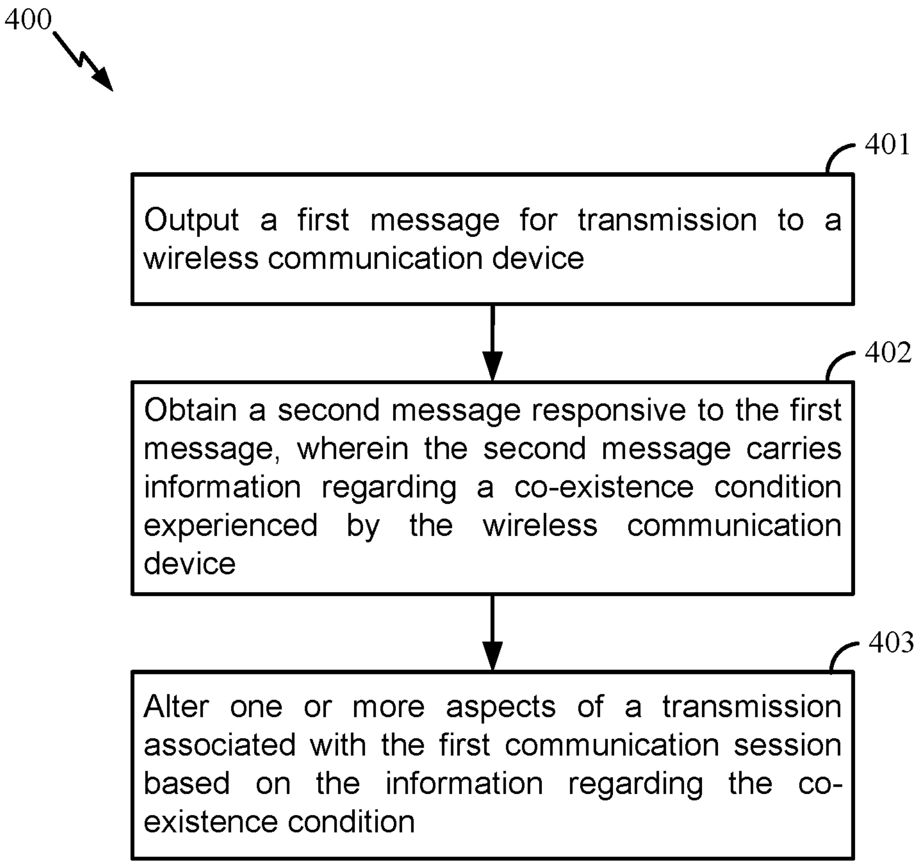
FIG. 4 shows a flowchart illustrating an example process performable at a wireless communication device, which is a peer wireless communication device to a wireless communication device at which a co-existence condition is experienced, that supports providing co-existence condition information via response messages.

FIG. 3 shows a flowchart illustrating an example process 300 performable at a wireless communication device, at which a co-existence condition is experienced, that supports providing co-existence condition information via response messages according to some aspects of the present disclosure. FIG. 4 shows a flowchart illustrating an example process 400 performable at a wireless communication device, which is a peer wireless communication device to a wireless communication device at which a co-existence condition is experienced, that supports providing co-existence condition information via response messages according to some aspects of the present disclosure.

Referring first to FIG. 3, the operations of the process 300 may be implemented by a wireless communication device, or its components, at which a co-existence condition is experienced as described herein. For example, the process 300 may be performed by an apparatus for wireless communication, such as may be or may be included as part of the wireless communication device 500 described with reference to FIG. 5, operating as or within a wireless AP (for example, one of APs 102 described with reference to FIG. 1), a wireless STA (for example, one of STAs 104 described with reference to FIG. 1), or other configuration of apparatus for wireless communication at which a co-existence condition is experienced. In some examples, the process 300 may be performed in or by an instance of wireless device 202*a* described with reference to FIG. 1.

In some examples, in block 301, the apparatus for wireless communication performs a first communication session with a wireless communication device and one or more second communication sessions in which a co-existence condition is experienced. In some aspects, the co-existence condition is associated with interference at the apparatus, the interference being experienced due to the first communication session and the one or more second communication sessions. According to an example, the apparatus for wireless communication (for example, the apparatus for wireless communication operating as or within wireless communication device 202*a* described with reference to FIG. 2) may perform a first communication session (for example, communication session 211) with a wireless communication device (for example, wireless communication device 202*b*) under control of a communication manager using one or more transceiver Tx/Rx chains. Additionally, the apparatus for wireless communication may perform one or more second communication sessions (for example, communication session 212) with one or more wireless communication devices (for example, wireless communication device 202*b*, wireless communication device 202*c*, or a combination thereof) under control of the communication manager using one or more transceiver Tx/Rx chains. The first communication session and one or more of the second communication sessions may be in accordance with a same or different communication protocol (for example, simultaneous communication according one or more of a Wi-Fi, cellular, ZIGBEE, THREAD, BLUETOOTH, etc. protocols) and may utilize a same frequency band, different frequency bands, or a combination thereof.

In operation according to some aspects, the apparatus for wireless communication may experience a co-existence condition in association with performing the first communication session and the one or more second communication sessions. For example, some portion of the first communication session and some portion of the one or more second communication sessions may utilize a same frequency band or may otherwise utilize frequencies (for example, adjacent frequency bands, frequency bands with inadequate guard band separation, frequency bands having one or more impinging harmonic frequency, etc.) that result in interference being experienced internally (in-device) to the apparatus for wireless communication. As another example, the Tx/Rx chains of a transceiver utilized with respect to the first communication session and the one or more second communication sessions may implement local oscillator frequencies for processing signals of a respective communication session which are harmonics of, and cause in-device interference to, signals of another communication session as processed by its respective wireless communication Tx/Rx chain. The above mentioned in-device co-existence harmonic interference may occur even in situations where the multiple communication sessions do not utilize a same frequency band.

As shown by the foregoing, an in-device co-existence condition may be experienced, at or by the apparatus for wireless communication, due to the first communication session and the one or more second communication sessions in a variety of situations. The in-device co-existence is independent from, and may be experienced in addition to, external interference, such as introduced by the channel conditions, wireless medium multiple access collisions, etc. Circuitry and logic of a wireless communication device may be configured to identify, detect, or otherwise determine instances of co-existence conditions. For example, logic implemented by a communications manager, co-existence condition logic, etc. may operate to determine that an apparatus for wireless communication will experience, is experiencing, or has experienced an in-device co-existence condition. A co-existence condition may be detected in scenarios where Wi-Fi and BLUETOOTH communications are performed simultaneously, for example, by the software or firmware that manages the common resources (such as radio resources, antennas, memory) triggering a notification event to the Wi-Fi module to indicate that BLUETOOTH is active and that, as result, all Wi-Fi activities may be turned off, Wi-Fi may be operated with some constraints (for example, reduced antenna, reduced buffer/memory size, etc.). Where Wi-Fi and cellular communications are performed simultaneously having common resources, similar operations may likewise be performed. As another example, a co-existence condition may be detected in scenarios where a Wi-Fi resource is shared between two different Wi-Fi connections (for example, an infrastructure connection to an access point and a p2p connection with another device, such as phone connected to home AP and also streaming content to a smart TV) by the Wi-Fi drive itself having hooks to indicate co-existence conditions and the extent of resource sharing which may lead certain actions (for example, stop frame exchange or operate under constrained conditions).

Operation to determine that a co-existence condition exists may further identify, detect, or otherwise determine various information regarding the co-existence condition, such as information regarding the cause of the co-existence condition (for example, a particular cause of the co-existence condition, a periodicity of the co-existence condition, one or more signal attributes associated with or corresponding to the co-existence condition, etc.), information facilitating avoidance of the co-existence condition (for example, one or more transmit or operational parameters, such as frequency resources, time resources, modulation parameters, transmission scheduling, redundancy, etc. to be used for transmission of a signal, a duration of the co-existence condition, a request to change an acknowledgment policy to be used with respect to carrying co-existence condition information, etc.), and combinations thereof.

In block 302 of some examples, the apparatus for wireless communication obtains a first message from the wireless communication device. According to an example, the apparatus for wireless communication (for example, the apparatus for wireless communication operating as or within wireless communication device 202*a*) may obtain (for example, receive via one or more transceiver Tx/Rx chains operating under control of a communication manager, obtain from the one or more transceiver Tx/Rx chains, etc.) one or more messages from the wireless communication device (for example, wireless communication device 202*b*). In some aspects, the first message may be transmitted by the wireless communication device to the apparatus for wireless communication for a purpose other than soliciting co-existence condition information. According to some examples, the first message may include a management message, a control message, a data message, or combination thereof.

According to some aspects, the first message may be communicated as part of the first communication session (for example, communication session 211). The first message may, for example, be included in the communications for which the apparatus for wireless communication experiences a co-existence condition in association with performing the first communication session and the one or more second communication sessions. Alternatively, the first message may not be included in the communications for which the apparatus for wireless communication experiences the co-existence condition. For example, the first message may be communicated in a period of time, via a particular channel, using different communication resources, etc. than is associated with the co-existence condition. The first message of some examples may be obtained by the apparatus for wireless communication prior to, contemporaneously with, or after experiencing the co-existence condition.

In some examples, in block 303, the apparatus for wireless communication outputs, for transmission, a second message responsive to the first message, wherein the second message carries information regarding the co-existence condition. For example, the information regarding the co-existence condition may be "piggybacked" into or otherwise embedded into the second/response message. In some aspects, the second message may be transmitted to the wireless communication device via an existing or otherwise prior established messaging channel established for messaging of information other than co-existence condition information. That is, the second message/response message may not be meant for gathering or communication co-existence information. Nevertheless, the information regarding co-existence is included in the second message/response message according to some examples, such as to provide a fast indication of the condition to a peer wireless communication device so that the transmitter can take appropriate actions (for example, delay, pause, or stop transmission, alter transmit parameters, alter operational parameters, etc.).

According to an example, the apparatus for wireless communication (for example, the apparatus for wireless communication operating as or within wireless communication device 202*a*) may output (for example, transmit via one or more transceiver Tx/Rx chains operating under control of a communication manager, provide to the one or more transceiver Tx/Rx chains, etc.) one or more messages (for example, message 231) responsive to the first message (for example, message 221) for transmitting to the wireless communication device (for example, wireless communication device 202*b*). According to some examples, the second message may include a response to a management message, a control message, a data message, or combination thereof.

The second message may be output or transmitted on a same link or channel where the co-existence condition is experienced or on another link or channel. For example, a co-existence condition may be experienced with respect to communications on a first channel (for example, a first channel in the 2.4 GHz band) and the second message carrying information regarding the co-existence condition may be transmitted on the first channel (for example, the first channel in the 2.4 GHz band). In another example, a co-existence condition may be experienced with respect to communications on a first channel (for example, a first channel in the 2.4 GHz band) and the second message carrying information regarding the co-existence condition may be transmitted on a second channel (for example, a second channel in the 5 GHz band). In a situation in which a link or channel is used for communication of information regarding a co-existence condition other than a link or channel where the co-existence condition is experienced, information providing a link identifier (for example, configured to identify the link where the co-ex condition is experienced) may be included in the information regarding a co-existence condition.

According to some examples, circuitry and logic of the apparatus for wireless communication may be configured to analyze the first communication session (for example, communication session 211) and the one or more second communication sessions (for example, communication session 212) to identify, detect, or otherwise determine information regarding a co-existence condition. For example, logic implemented by a communications manager, co-existence condition logic, etc. may operate to determine an instance of a co-existence condition, to determine one or more parameters (for example, frequency resources, time resources, modulation parameters, transmission scheduling, redundancy, etc.) associated with the co-existence condition, to determine how the one or more parameters are to be altered, etc. with respect to a transmission of the first communication session for inclusion as the information regarding a co-existence condition in the second message. Additionally or alternatively, logic implemented by a communications manager, co-existence condition logic, etc. may operate to determine if the apparatus for wireless communication can continue to receive transmissions for the first communication session, whether to pause or delay transmissions for the first communication session, how long to pause or delay transmissions of the first communication session, etc. for inclusion as the information regarding a co-existence condition in the second message.

The second message is a message that is in response to one or more messages from the wireless communication device which is configured, adapted, or otherwise utilized to carry information regarding a co-existence condition. Information regarding a co-existence condition as may be carried via the second message may, for example, indicate that the apparatus for wireless communication is experiencing a co-existence condition. Additionally or alternatively, information regarding a co-existence condition carried via the second message may include information regarding the co-existence condition, such as whether the apparatus for wireless communication is able to receive additional data packets while experiencing the co-existence condition, information with respect to one or more transmit or operational parameters for transmitting signals of the first communication session, an expected duration of the co-existence condition, etc.

Figure 6:
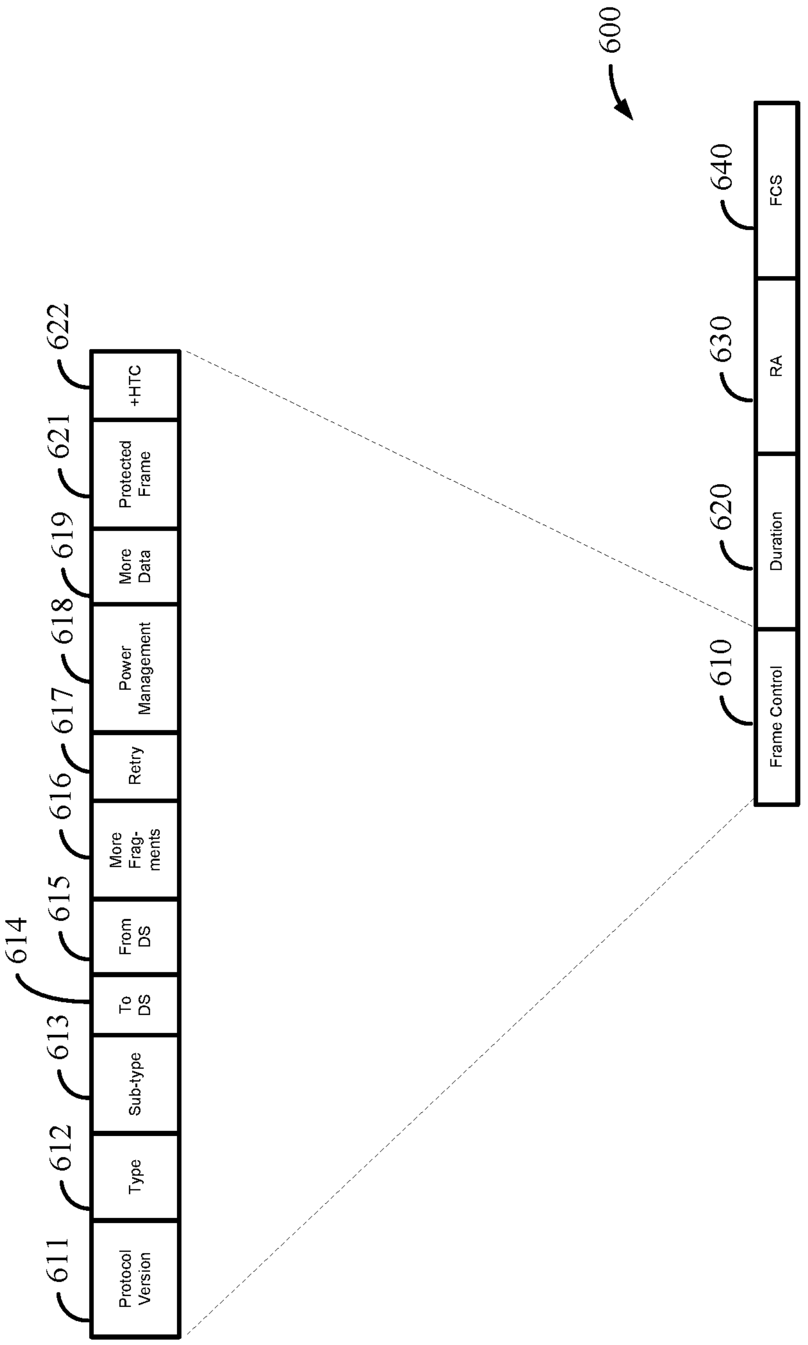
FIG. 6 shows an example of an acknowledgment frame usable for carrying information regarding a co-existence condition.

In some examples, the second message may include a response message in the form of an acknowledgement (for example, ACK or NACK) message implemented for indicating that data has been received successfully or not. FIG. 6 shows an example of an acknowledgment frame usable for carrying information regarding a co-existence condition. Acknowledgment frame 600 may, for example, provide a frame format of a legacy, basic acknowledgment message.

Acknowledgment frame 600 of the example of FIG. 6 includes multiple fields, shown as frame control field 610, duration field 620, receiving address field 630, and frame check sequence field 640. One or more of these fields may be configured, adapted, or otherwise utilized to carry information regarding a co-existence condition. For example, some or all of the foregoing fields of acknowledgment frame 600 may include sub-fields of various bit lengths, whereby bits of one or more such sub-fields may be utilized to carry information regarding a co-existence condition. According to some examples, sub-fields which are not applicable or which otherwise are unused or non-material to the original intended use of the response message (for example, sub-fields which are not particularly relevant to an acknowledgement message in the example of FIG. 6) may be repurposed for providing information regarding a co-existence condition.

In the example of FIG. 6, frame control field 610 includes multiple sub-fields, shown as protocol version sub-field 611, type sub-field 612, subtype sub-field 613, to distribution system sub-field 614, from distribution system sub-field 615, more fragments sub-field 616, retry sub-field 617, power management sub-field 618, more data sub-field 619, protected frame sub-field 621, and high throughput control sub-frame 622. One or more of the sub-fields of frame control field 610 (for example, more fragments sub-field 616, retry sub-field 617, power management sub-field 618, more data sub-field 619, high throughput control sub-frame 622, or a combination thereof) may not be particularly applicable to an acknowledgment message and thus one or more such sub-fields may be utilized according to some aspects to carry information regarding a co-existence condition. As an example, a bit of one such sub-field may be set to indicate that the apparatus for wireless communication is experiencing a co-existence condition. Additionally or alternatively, multiple bits of one or more such sub-fields may be set to provide co-existence condition information. According to some examples, a combination of sub-fields may be used to indicate that the apparatus for wireless communication is experiencing a co-existence condition, to provide co-existence condition information, or a combination thereof.

Figure 7:
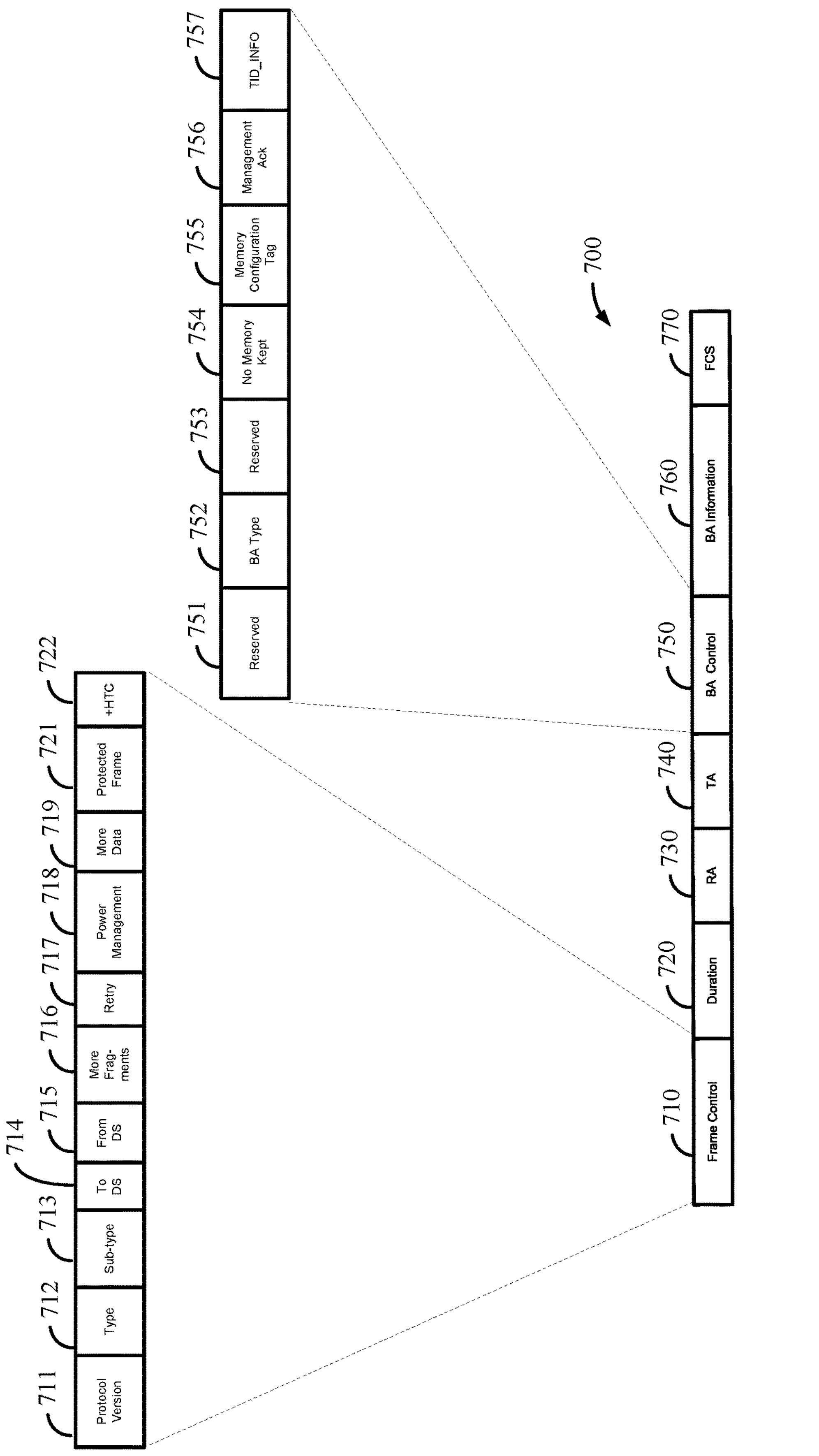
FIG. 7 shows another example of an acknowledgment frame usable for carrying information regarding a co-existence condition.

FIG. 7 shows another example of an acknowledgment frame usable for carrying information regarding a co-existence condition. Acknowledgment frame 700 may, for example, provide a frame format of a block acknowledgment message.

Acknowledgment frame 700 of the example of FIG. 7 includes multiple fields, shown as frame control field 710, duration field 720, receiving address field 730, transmitter address field 740, block acknowledgment control field 750, block acknowledgment information field 760, and frame check sequence field 770. One or more of these fields may be configured, adapted, or otherwise utilized to carry information regarding a co-existence condition. For example, some or all of the foregoing fields of acknowledgment frame 700 may include sub-fields of various bit lengths, whereby bits of one or more such sub-fields may be utilized to carry information regarding a co-existence condition. According to some examples, sub-fields which are not applicable or which otherwise are unused or non-material to the original intended use of the response message (for example, sub-fields which are not particularly relevant to an acknowledgement message in the example of FIG. 7) may be repurposed for providing information regarding a co-existence condition.

As with the example of FIG. 6, in the example of FIG. 7, frame control field 710 includes multiple sub-fields, shown as protocol version sub-field 711, type sub-field 712, subtype sub-field 713, to distribution system sub-field 714, from distribution system sub-field 715, more fragments sub-field 716, retry sub-field 717, power management sub-field 718, more data sub-field 719, protected frame sub-field 721, and high throughput control sub-frame 722. As described above with reference to FIG. 6, one or more of the sub-fields of frame control field 710 may be used to indicate that the apparatus for wireless communication is experiencing a co-existence condition, to provide co-existence condition information, or a combination thereof.

Further, in the example of FIG. 7, block acknowledgment control field 750 includes multiple sub-fields, shown as reserved sub-field 751, block acknowledgment type sub-field 752, reserved sub-field 753, no memory kept sub-field 754, memory configuration tag sub-field 755, management acknowledgment sub-field 756, and transmitter address information sub-field 757. One or more of the sub-fields of block acknowledgment control field 750 (for example, reserved sub-field 751, reserved sub-field 753, no memory kept sub-field 754, memory configuration tag sub-field 755, management acknowledgment sub-field 756, and transmitter address information sub-field 757, or a combination thereof) may not be particularly applicable to an acknowledgment message and thus one or more such sub-fields may be utilized according to some aspects to carry information regarding a co-existence condition. As an example, a bit of one such sub-field may be set to indicate that the apparatus for wireless communication is experiencing a co-existence condition. Additionally or alternatively, multiple bits of one or more such sub-fields may be set to provide co-existence condition information. According to some examples, a combination of the block acknowledgment control sub-fields, possibly with one or more frame control sub-fields, may be used to indicate that the apparatus for wireless communication is experiencing a co-existence condition, to provide co-existence condition information, or a combination thereof.

Figure 8:
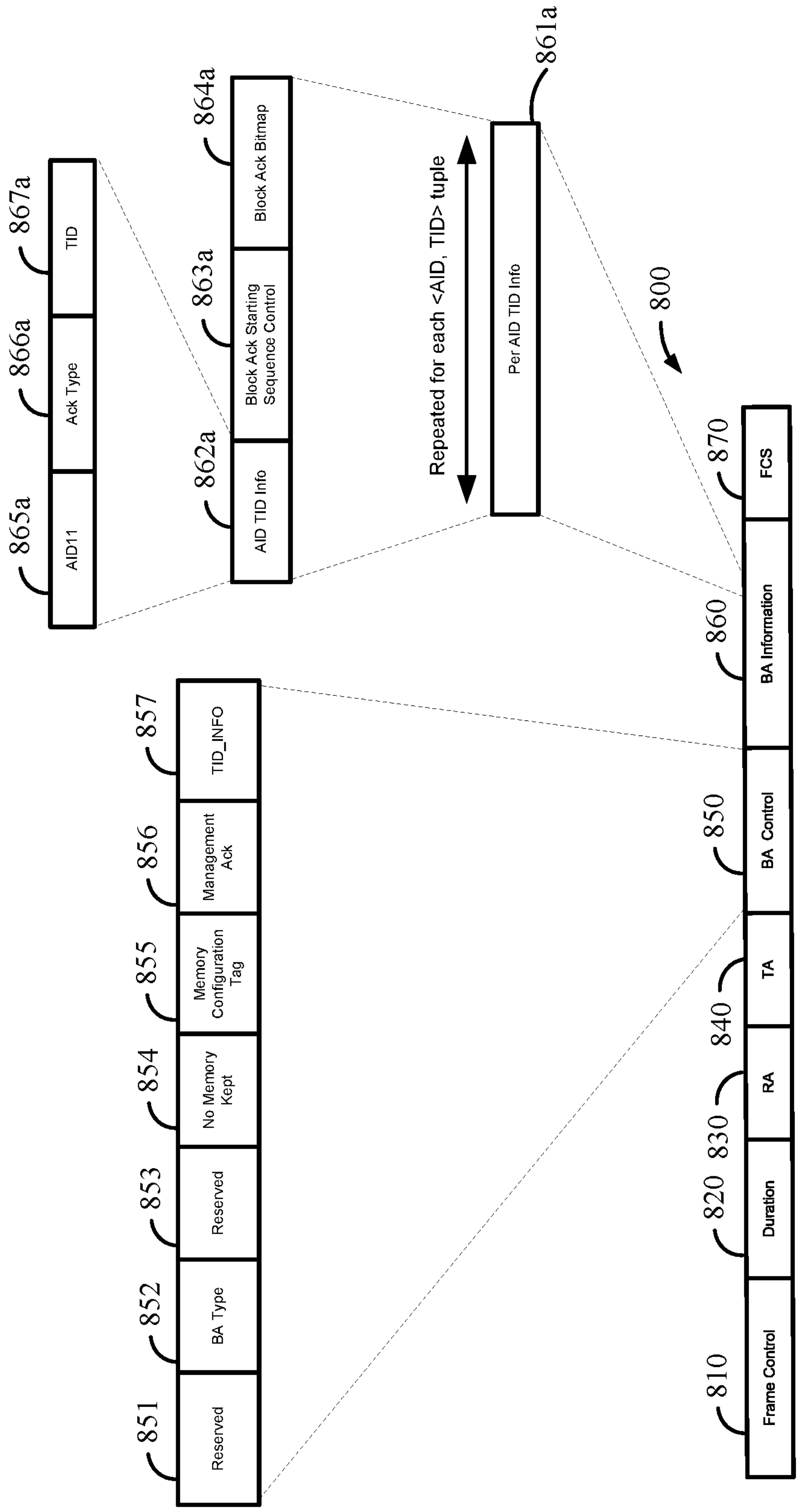
FIG. 8 shows still another example of an acknowledgment frame usable for carrying information regarding a co-existence condition.

FIG. 8 shows still another example of an acknowledgment frame usable for carrying information regarding a co-existence condition. Acknowledgment frame 800 may, for example, provide a frame format of a multi-station block acknowledgment (Multi-STA BA) message. The use of a multi-station block acknowledgment message according to some aspects may facilitate delivery of the information regarding a co-existence condition in a secure, trusted manner. For example, data of a multi-station block acknowledgment message may be provided security using a mechanism for protecting control frames expected to be implemented according to the IEEE 802.11bn communication protocol standards.

As with the example of FIG. 7, acknowledgment frame 800 of the example of FIG. 8 includes multiple fields, shown as frame control field 810, duration field 820, receiving address field 830, transmitter address field 840, block acknowledgment control field 850, block acknowledgment information field 860, and frame check sequence field 870. One or more of these fields may be configured, adapted, or otherwise utilized to carry information regarding a co-existence condition. For example, some or all of the foregoing fields of acknowledgment frame 800 may include sub-fields of various bit lengths, whereby bits of one or more such sub-fields may be utilized to carry information regarding a co-existence condition. According to some examples, sub-fields which are not applicable or which otherwise are unused or non-material to the original intended use of the response message (for example, sub-fields which are not particularly relevant to an acknowledgement message in the example of FIG. 8) may be repurposed for providing information regarding a co-existence condition.

Although not expressly shown in order to simplify the illustration of FIG. 8, as with the examples of FIGS. 6 and 7, frame control field 810 of FIG. 8 may include multiple sub-fields (for example, a protocol version sub-field, a type sub-field, a subtype sub-field, a to distribution system sub-field, a from distribution system sub-field, a more fragments sub-field, a retry sub-field, a power management sub-field, a more data sub-field, a protected frame sub-field, a high throughput control sub-frame, etc.). As described above with reference to FIG. 6, one or more of the sub-fields of frame control field 810 may be used to indicate that the apparatus for wireless communication is experiencing a co-existence condition, to provide co-existence condition information, or a combination thereof.

As with the example of FIG. 7, in the example of FIG. 8, block acknowledgment control field 850 includes multiple sub-fields, shown as reserved sub-field 851, block acknowledgment type sub-field 852, reserved sub-field 853, no memory kept sub-field 854, memory configuration tag sub-field 855, management acknowledgment sub-field 856, and transmitter address information sub-field 857. As described above with reference to FIG. 7, one or more of the sub-fields of block acknowledgment control field 850 may be used to indicate that the apparatus for wireless communication is experiencing a co-existence condition, to provide co-existence condition information, or a combination thereof. According to some examples, a combination of the block acknowledgment sub-fields, possibly with one or more frame control sub-fields, may be used to indicate that the apparatus for wireless communication is experiencing a co-existence condition, to provide co-existence condition information, or a combination thereof.

Further, in the example of FIG. 8, block acknowledgment information field 860 includes multiple sub-fields. In particular, an instance of a per association identifier (AID) traffic identifier (TID) information sub-field may be repeated for each AID, TID tuple. An instance of an AID TID information sub-field is shown as per AID TID information field 861*a* (for example, block acknowledgment information field 860 may include n instances of per AID TID information fields). Each instance of a per AID TID information sub-field may themselves include multiple sub-fields. For example, per AID TID information sub-field 861*a* of the example in FIG. 8 includes multiple sub-fields, shown as AID TID information sub-field 862*a*, block acknowledgment starting sequence control sub-field 863*a*, and block acknowledgment bitmap 864*a*. The particular sub-fields of a per AID TID information sub-field may vary, such as depending upon the AID information. One or more sub-fields of a per AID TID information field may themselves further include multiple sub-fields. For example, AID TID information sub-field 862*a* of the example in FIG. 8 includes multiple sub-fields, shown as AID11 sub-field 865*a*, acknowledgment type sub-field 866*a*, and TID sub-field 867*a*. One or more sub-fields of an instance of a per AID TID information field may be utilized according to some aspects to carry information regarding a co-existence condition, as described in the above examples.

In accordance with some examples, an instance of a per AID TID information field may be included in block acknowledgement information field 860 to carry information regarding a co-existence condition. That is, according to some aspects, block acknowledgment information field 860 of acknowledgment frame 800 may be extended to carry co-existence condition information. In an example, at least one of AID11 sub-field 865*a*, acknowledgement type sub-field 866*a*, or TID sub-field 867*a* may be configured or otherwise used to provide at least a portion of the information regarding the-coexistence condition. A certain combination of AID, acknowledgment type, and TID values may, for example, identify the information in the per AID TID information sub-frame as co-existence condition information. Additionally or alternatively, block acknowledgment bitmap sub-field 864*a* may provide information regarding a co-existence condition. For example, the block acknowledgement bitmap may be missing (for example, null ACK) to indicate that a PPDU was received but could not be processed due to an in-device co-existence condition. According to some examples, a first AID, acknowledgment type, and TID value combination may provide an acknowledgment status of received MPDUs while a second AID, acknowledgment type, and TID value combination may signal that the absence of a block acknowledgment bitmap to indicates do not send any more MPDUs sue to an in-device co-existence condition. According to some examples, a combination of the block acknowledgment information sub-fields, possibly with one or more block acknowledgment control sub-fields, frame control sub-fields, or a combination thereof, may be used to indicate that the apparatus for wireless communication is experiencing a co-existence condition, to provide co-existence condition information, or a combination thereof.

The examples above described with reference to FIGS. 6, 7, and 8 each illustrate implementations in which co-existence condition information is provided via response messages in the form of acknowledgment messages. It is to be understood, however, that the foregoing examples are not exhaustive of, or limiting with respect to, the types of response messages that may be utilized to carry information regarding a co-existence condition according to some aspects of the disclosure. In particular, the second message may be in the form of a response message in addition to or in the alternative to an acknowledgment message. According to some examples, a response message in the form of a data or control message may include information regarding a co-existence condition in one or more sub-fields of a frame control field. Additionally or alternatively, a response message in the form of a data or control message may include information regarding a co-existence condition in one or more sub-fields of an information field (for example, a control information sub-field, a payload information sub-field, etc.).

In an example of a second message in a form other than a response message, the apparatus for wireless communication experiencing a co-existence condition may output a message for transmission to a peer wireless communication device indicating that it is requesting to change the acknowledgement policy between the apparatus for wireless communication and the peer wireless communication device. This message, although responsive to communications in accordance with the acknowledgement policy (for example, acknowledgment policy information is often carried in each MPDU and may be indicated at an individual frame level), does not itself provide an acknowledgment message. This communication may be utilized according to some examples so that apparatus for wireless communication experiencing the co-existence condition does not need to send an acknowledgement message immediately (for example, in SIFS/16 us time), but rather a delayed acknowledgment message. According to some examples, the acknowledgment policy may be changed to a block acknowledgment policy (for example, for use of a block acknowledgment message as described above with reference to FIG. 7 or FIG. 8). The apparatus for wireless communication may receive further messages of a first communication session, in some examples with modified transmit or operational parameters, while it is experiencing a co-existence condition and then send a (for example, consolidated) acknowledgment for all received MPDUs after it is no longer facing the co-existence condition. The foregoing situation may, for example, occur when the apparatus for wireless communication is in receive state on the co-existence condition and getting into transmit state on a Wi-Fi link can cause interference.

Irrespective of the particular form of a response message, as shown in the above examples, one or more fields, sub-fields, etc. of the second message may be configured or otherwise utilized (for example, by co-existence condition logic of the apparatus for wireless communication) to carry information regarding the co-existence condition. The information regarding a co-existence condition may indicate that the apparatus for wireless communication will experience, is experiencing, or has experienced an in-device co-existence condition. Additionally or alternatively, the information regarding a co-existence condition may provide co-existence condition information facilitating mitigation or avoidance of the co-existence condition. According to some examples, one or more sub-fields of the second message may be used to indicate the co-existence condition and to signal to the wireless communication device not to transmit signals of the first communication session to the apparatus for wireless communication. In accordance with some examples, one or more sub-fields of the second message may be used to indicate the co-existence condition and to signal to the wireless communication device to transmit signals of the first communication session to the apparatus for wireless communication using certain transmit or operational parameters.

Although not expressly shown in process 300 of the example of FIG. 3, the apparatus for wireless communication may obtain (for example, receive via one or more transceiver Tx/Rx chains operating under control of a communication manager, obtain from the one or more transceiver Tx/Rx chains, etc.) a signal of the first communication session having one or more aspects altered based on the information regarding the co-existence condition. For example, a frequency resource, time resource, modulation parameter, transmission schedule etc. may be altered for transmission of a signal of the first communication session based on the information regarding the co-existence condition. Additionally or alternatively, transmission of a signal of the first communication session may be paused or delayed based on the information regarding the co-existence condition.

Referring now to FIG. 4, the operations of the process 400 may be implemented by a wireless communication device or its components that is a peer to a wireless communication device at which a co-existence condition is experienced as described herein. For example, the process 400 may be performed by an apparatus for wireless communication, such as may be or may be included as part of the wireless communication device 500 described with reference to FIG. 5, operating as or within a wireless AP (for example, one of APs 102 described with reference to FIG. 1), a wireless STA (for example, one of STAs 104 described with reference to FIG. 1), or other configuration of apparatus for wireless communication which is a peer to a wireless communication device at which a co-existence condition is experienced. In some examples, the process 400 may be performed by an instance of wireless communication device 202*b* described with reference to FIG. 1.

In some examples, in block 401, the apparatus for wireless communication outputs a first message for transmission to a wireless communication device. According to an example, the apparatus for wireless communication (for example, the apparatus for wireless communication operating as or within wireless communication device 202*b*) may output (for example, transmit via one or more transceiver Tx/Rx chains operating under control of a communication manager, output to the one or more transceiver Tx/Rx chains, etc.) one or more messages (for example, message 221) for transmission to the wireless communication device (for example, wireless communication device 202*a*). In some aspects, the first message may be output by the apparatus for wireless communication for transmission to the wireless communication device for a purpose other than soliciting co-existence condition information. According to some examples, the first message may include a management message, a control message, a data message, or combination thereof.

As described above with reference to FIG. 3, the first message may be communicated as part of the first communication session (for example, communication session 211). The first message may or may not be included in the communications for which the apparatus for wireless communication experiences a co-existence condition in association with performing the first communication session and the one or more second communication sessions. The first message may be communicated in a period of time, via a particular channel, using different communication resources, etc. than is associated with the co-existence condition. The first message may be output by the apparatus for wireless communication prior to, contemporaneously with, or after the wireless communication device experiences the co-existence condition.

In block 402 of some examples, the apparatus for wireless communication obtains a second message responsive to the first message, wherein the second message carries information regarding a co-existence condition experienced by the wireless communication device. In some aspects, the co-existence condition is associated with interference at the wireless communication device, the interference being experienced due to a first communication session and one or more second communication sessions performed by the wireless communication device. According to an example, the apparatus for wireless communication (for example, the apparatus for wireless communication operating as or within wireless communication device 202*b*) may obtain (for example, receive via one or more transceiver Tx/Rx chains operating under control of a communication manager, receive from the one or more transceiver Tx/Rx chains, etc.) one or more messages (for example, message 231) responsive to the first message (for example, message 221) transmitted by the wireless communication device (for example, wireless communication device 202*a*). The wireless communication device may perform one or more second communication sessions (for example, communication session 212) with one or more wireless communication devices (for example, wireless communication device 202*b*, wireless communication device 202*c*, or a combination thereof), whereby the wireless communication device experiences a co-existence condition due to the first communication session and one or more of the second communication sessions.

As described above with reference to FIG. 3, according to some aspects, the second message is a message that is in response to one or more messages from the wireless communication device which is configured, adapted, or otherwise utilized to carry information regarding a co-existence condition. The second message may, for example, include a response message in the form of an acknowledgement (for example, ACK or NACK) message implemented for indicating that data has been received successfully or not configured to carry information regarding a co-existence condition as described above with reference to FIGS. 6, 7, and 8. Information regarding a co-existence condition as may be carried via the second message may, for example, indicate that the apparatus for wireless communication is experiencing a co-existence condition. Additionally or alternatively, information regarding a co-existence condition carried via the second message may include information regarding the co-existence condition, such as whether the apparatus for wireless communication is able to receive additional data packets while experiencing the co-existence condition, information with respect to one or more transmit or operational parameters for transmitting signals of the first communication session, an expected duration of the co-existence condition, etc.

In some examples, in block 403, the apparatus for wireless communication alters one or more aspects of a transmission associated with the first communication session based on the information regarding the co-existence condition. According to some examples, circuitry and logic of the apparatus for wireless communication may be configured to analyze information regarding co-existence conditions and alter one or more aspects of a subsequent transmission (for example, message 241) of the first communication session (for example, communication session 211) based on the information regarding co-existence conditions. For example, logic implemented by a communications manager, co-existence condition logic, etc. may operate to determine one or more transmit or operational parameters (for example, frequency resources, time resources, modulation parameters, transmission scheduling, redundancy, etc.) to be altered, how the one or more transmit or operational parameters are to be altered (for example, change one or more frequency resources, change one or more time resources, use a more robust modulation technique, cancel or reschedule one or more transmission, add or increase data redundancy), etc. with respect to a transmission of the first communication session based on the information regarding a co-existence condition obtained from the second message. Additionally or alternatively, logic implemented by a communications manager, co-existence condition logic, etc. may operate to determine to pause or delay, how long to pause or delay, etc. a transmission of the first communication session based on the information regarding a co-existence condition obtained from the second message.

Operation to alter one or more aspects of a transmission associated with the first communication session by the apparatus for wireless communication based on the information regarding the co-existence condition may facilitate improved or optimized communications with respect to one or more communication sessions of the first communication session and the one or more second communication sessions. For example, in a situation in which an in-device co-existence condition results in a failure to receive packets of the first communication session at the receiving wireless communication device, the apparatus for wireless communication transmitting signals of the first communication session may implement remediation techniques (for example, an increased back-off time, a more robust modulation scheme, a lower bandwidth channel, etc.) suitable for addressing other forms of interference (for example, external interference, such as introduced by the channel conditions, wireless medium multiple access collisions, etc.). These remediation techniques often do not, however, remediate in-device interference of a co-existence condition, and thus may result in decreased performance (for example, lower throughput) without mitigating or avoiding the co-existence condition source of the interference. Providing a response message carrying information regarding a co-existence condition according to aspects of the disclosure acts as a fast feedback to the transmitter and allows the transmitter to adapt to the co-existence condition.

Figure 5:
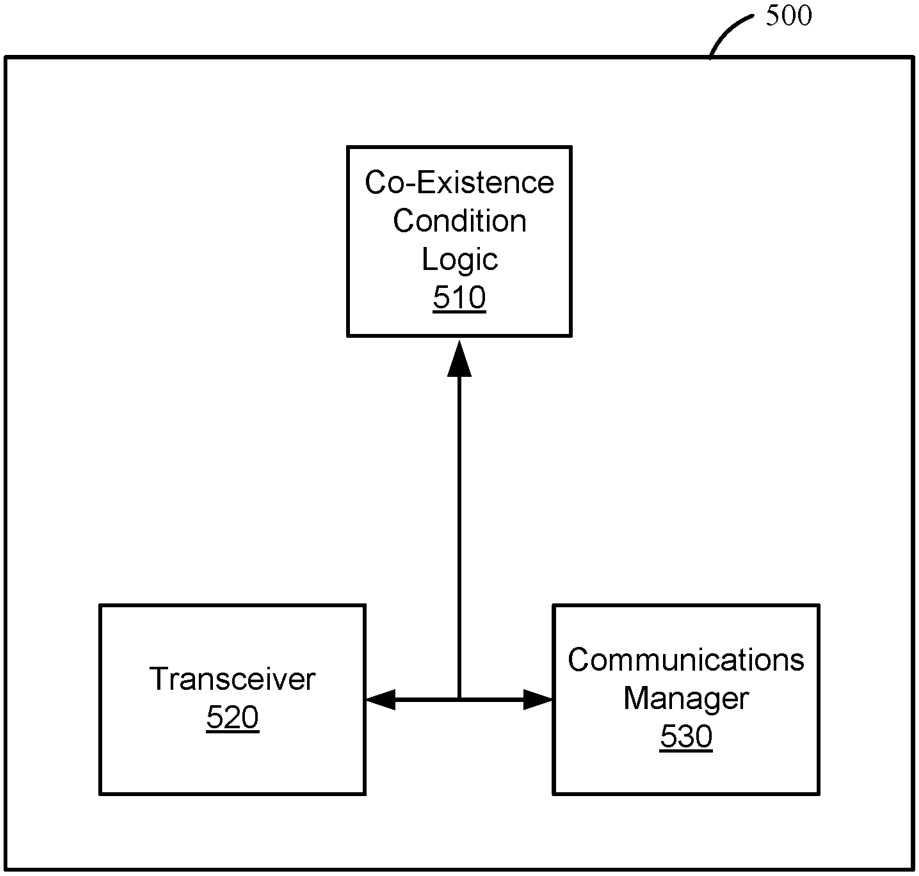
FIG. 5 shows a block diagram of an example apparatus for wireless communication that supports providing co-existence condition information via response messages.

FIG. 5 shows a block diagram of an example wireless communication device that supports providing co-existence condition information via response messages according to some aspects of the present disclosure. In an example in which the wireless communication device 500 experiences co-existence conditions, the wireless communication device 500, or one or more apparatus for wireless communication thereof, is configured or operable to perform the process 300 described with reference to FIG. 3. Additionally or alternatively, in an example in which the wireless communication device 500 is a peer to a wireless communication device at which a co-existence condition is experienced, the wireless communication device 500, or one or more apparatus for wireless communication thereof, is configured or operable to perform the process 400 described with reference to FIG. 4. In various examples, the wireless communication device 500 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 500 can be a device for use in an AP, such as AP 102 described with reference to FIG. 1 and as may provide an instance of any of wireless communication devices 202*a*, 202*b*, and 202*c* described with reference to FIG. 2. In some other examples, the wireless communication device 500 can be an AP that includes such a chip, SoC, chipset, package or device as well as multiple antennas. The wireless communication device 500 is capable of transmitting and receiving wireless communications in the form of, for example, wireless packets. For example, the apparatus for wireless communication can be configured or operable to transmit and receive packets in the form of physical layer PPDUs and MPDUs conforming to one or more of the IEEE 802.11 family of wireless communication protocol standards. In some examples, the wireless communication device 500 also includes or can be coupled with an application processor which may be further coupled with another memory. In some examples, the wireless communication device 500 further includes at least one external network interface that enables communication with a core network or backhaul network to gain access to external networks including the Internet.

In some examples, the wireless communication device 500 can be a device for use in a STA, such as STA 104 described with reference to FIG. 1 and as may provide an instance of any of wireless communication devices 202*a*, 202*b*, and 202*c* described with reference to FIG. 2. In some other examples, the wireless communication device 500 can be a STA that includes such a chip, SoC, chipset, package or device as well as multiple antennas. The wireless communication device 500 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 500 also includes or can be coupled with an application processor which may be further coupled with another memory. In some examples, the wireless communication device 500 further includes a user interface (UI) (such as a touchscreen or keypad) and a display, which may be integrated with the UI to form a touchscreen display. In some examples, the wireless communication device 500 may further include one or more sensors such as, for example, one or more inertial sensors, accelerometers, temperature sensors, pressure sensors, or altitude sensors.

The wireless communication device 500 includes a co-existence condition logic component 510, a transceiver component 520, and a communications manager component 530. Portions of one or more of the components 510, 520, and 530 may be implemented at least in part in hardware or firmware. For example, the transceiver component 520 may be implemented at least in part by a modem. In some examples, at least some of the components 510, 520, and 530 are implemented at least in part by a processor and as software stored in a memory. For example, portions of one or more of the components 510, 520, and 530 can be implemented as non-transitory instructions (or "code") executable by the processor to perform the functions or operations of the respective module.

In certain aspects, the co-existence condition logic component 510 includes code (such as an example of means for) for obtaining a first message from the wireless communication device, and code (such as an example of means for) for outputting, for transmission, a second message responsive to the first message, where the second message carries information regarding the co-existence condition. In certain aspects, the transceiver component 520 includes circuitry (such as an example of means for) for performing a first communication session with a wireless communication device and one or more second communication sessions in which a co-existence condition is experienced, where the co-existence condition is associated with interference at the apparatus, the interference being experienced due to the first communication session and the one or more second communication sessions, circuitry (such as an example of means for) for receiving a first message from the wireless communication device, circuitry (such as an example of means for) for transmitting a second message responsive to the first message, wherein the second message carries information regarding the co-existence condition.

In certain aspects, the co-existence condition logic 510 includes code (such as an example of means for) for outputting a first message for transmission to a wireless communication device, and code (such as an example of means for) for obtaining a second message responsive to the first message, where the second message carries information regarding a co-existence condition experienced by the wireless communication device, and where the co-existence condition is associated with interference at the wireless communication device, the interference being experienced due to a first communication session and one or more second communication sessions performed by the wireless communication device. In certain aspects, the transceiver component 520 includes circuitry (as an example of means for) for transmitting a first message for transmission to a wireless communication device, and circuitry (as an example of means for) for receiving a second message responsive to the first message, where the second message carries information regarding a co-existence condition experienced by the wireless communication device, and where the co-existence condition is associated with interference at the wireless communication device, the interference being experienced due to a first communication session and one or more second communication sessions performed by the wireless communication device. In certain aspects, communications manager component 530 includes code (as an example of means for) for altering one or more aspects of a transmission associated with the first communication session based on the information regarding the co-existence condition.

In some implementations, the processor may be a component of a processing system. A processing system may generally refer to a system or series of machines or components that receives inputs and processes the inputs to produce a set of outputs (which may be passed to other systems or components of, for example, the wireless communication device 500). For example, a processing system of the wireless communication device 500 may refer to a system including the various other components or subcomponents of the wireless communication device 500, such as the processor, or the transceiver component 520, or the communications manager component 530, or other components or combinations of components of the wireless communication device 500. The processing system of the wireless communication device 500 may interface with other components of the wireless communication device 500, and may process information received from other components (such as inputs or signals) or output information to other components. For example, a chip or modem of the wireless communication device 500 may include a processing system, a first interface to output information and a second interface to obtain information. In some implementations, the first interface may refer to an interface between the processing system of the chip or modem and a transmitter, such that the wireless communication device 500 may transmit information output from the chip or modem. In some implementations, the second interface may refer to an interface between the processing system of the chip or modem and a receiver, such that the wireless communication device 500 may obtain information or signal inputs, and the information may be passed to the processing system. A person having ordinary skill in the art will readily recognize that the first interface also may obtain information or signal inputs, and the second interface also may output information or signal outputs.

The co-existence condition logic component 510 of some examples is configured to perform, manage, and/or control various functionality for communicating information regarding co-existence conditions. According to some examples, the co-existence condition logic component 510 includes circuitry and logic configured to perform one or more functions of process 300, process 400, or a combination thereof. The co-existence condition logic component 510 may operate in cooperation with the transceiver component 520, the communications manager component 530, or a combination thereof, such as for communication of information regarding co-existence conditions. In accordance with some examples, the co-existence condition logic component 510, or a portion thereof, may be included as part of the transceiver component 520, the communications manager component 530, or both.

In an implementation in which the wireless communication device 500 experiences co-existence conditions, the co-existence condition logic component 510 is capable of, configured to, or operable to identify, detect, or otherwise determine instances of co-existence conditions. For example, the co-existence condition logic component may be capable of, configured to, or operable to determine that the wireless communication device 500 will experience, is experiencing, or has experienced an in-device co-existence condition. According to some aspects, the co-existence condition logic component 501 is capable of, configured to, or operable to determine one or more parameters associated with the co-existence condition, to determine how the one or more parameters are to be altered, etc. with respect to a transmission of the first communication session for inclusion as the information regarding a co-existence condition in a response message. In accordance with some aspects, the co-existence condition logic component 501 is capable of, configured to, or operable to determine if the wireless communication device 500 can continue to receive transmissions for the first communication session, whether to pause or delay transmissions for the first communication session, how long to pause or delay transmissions of the first communication session, etc. for inclusion as the information regarding a co-existence condition in a response message. The co-existence condition logic component 510 may be capable of, configured to, or operable to obtain a first message from a wireless communication device and to output a second message responsive to the first message that includes information regarding a co-existence condition. The co-existence condition logic component 510 is capable of, configured to, or operable to modify, repurpose, or otherwise cause one or more fields or sub-fields of a response message to carry the information regarding a co-existence condition.

In an implementation in which the wireless communication device 500 is a peer to a wireless communication device at which a co-existence condition is experienced, the co-existence condition logic component 510 is capable of, configured to, or operable to analyze information regarding co-existence conditions obtained from a response message. For example, co-existence condition logic component 510 may be capable of, configured to, or operable to output a first message to a wireless communication device and to obtain a second message responsive to the first message that includes information regarding a co-existence condition. The co-existence condition logic component 510 may be capable of, configured to, or operable to determine one or more transmit or operational parameters to be altered, how the one or more transmit or operational parameters are to be altered, etc. with respect to a transmission of the first communication session based on the information regarding a co-existence condition obtained from a response message. The co-existence condition logic component 510 may be capable of, configured to, or operable to determine to pause or delay, how long to pause or delay, etc. a transmission of the first communication session based on the information regarding a co-existence condition obtained from a response message. In accordance with some aspects, the co-existence condition logic component 501 is capable of, configured to, or operable to manage, direct, control, or otherwise facilitate altering one or more aspects of a subsequent transmission of the first communication session based on the information regarding co-existence conditions.

The transceiver component 520 of some examples may include one or more wireless radios, such as may implement or may be included as part of one or more Tx/Rx chains, coupled to one or more antennas (not shown). According to some aspects, the transceiver component 520 may include various components and hardware, such as one or more modems, transmit processors, MIMO processors, receive processors, MIMO detectors, etc. The transceiver component 520 may operate under control of communications manager component 530, such as for establishing and maintaining wireless communications with one or more wireless communication devices. The transceiver component 520 may additionally operate in cooperation with co-existence condition logic component 510, such as for communication of information regarding co-existence conditions.

In an implementation in which the wireless communication device 500 experiences co-existence conditions, the transceiver component 520 is capable of, configured to, or operable to perform communications of a first communication session with a first wireless communication device. The transceiver component 520 may additionally be capable of, configured to, or operable to perform communications of a second communication session with one or more wireless communication devices, such as may or may not include the first wireless communication device. The transceiver component 520 may be capable of, configured to, or operable to receive a first message from a wireless communication device and to transmit a second message responsive to the first message.

In an implementation in which the wireless communication device 500 is a peer to a wireless communication device at which a co-existence condition is experienced, the transceiver component 520 is capable of, configured to, or operable to perform communications of a first communication session with a first wireless communication device and to perform communications of a second communication session with one or more wireless communication devices, such as may or may not include the first wireless communication device. The transceiver component 520 may be capable of, configured to, or operable to transmit a first message to a wireless communication device and to receive a second message responsive to the first message. The transceiver component 520 of some aspects may be capable of, configured to, or operable to transmit a subsequent transmission of the first communication session having one or more aspects of the transmission altered based on information regarding a co-existence condition.

The communications manager component 530 of some examples is configured to perform, manage, and/or control various communication functionality with respect to wireless communication device 500. According to some examples, the communications manager component 530 includes circuitry and logic configured to manage and control communications via transceiver component 520. The communications manager component 530 may operate in cooperation with the co-existence condition logic component 510, the transceiver component 520, or a combination thereof, such as for communication of information regarding co-existence conditions. In accordance with some examples, the communications manager component 530, or a portion thereof, may be included as part of the transceiver component 520.

In an implementation in which the wireless communication device 500 experiences co-existence conditions, the communications manager component 530 *s* capable of, configured to, or operable to manage, direct, control, or otherwise facilitate communications of a first communication session with a first wireless communication device. The communications manager component 530 may additionally be capable of, configured to, or operable to manage, direct, control, or otherwise facilitate communications of a second communication session with one or more wireless communication devices, such as may or may not include the first wireless communication device. The communications manager component 530 may be capable of, configured to, or operable to manage, direct, control, or otherwise facilitate receiving a first message from a wireless communication device and transmitting a second message responsive to the first message.

In an implementation in which the wireless communication device 500 is a peer to a wireless communication device at which a co-existence condition is experienced, the communications manager component 530 is capable of, configured to, or operable to manage, direct, control, or otherwise facilitate communications of a first communication session with a first wireless communication device and to manage, direct, control, or otherwise facilitate communications of a second communication session with one or more wireless communication devices, such as may or may not include the first wireless communication device. The communications manager component 530 may be capable of, configured to, or operable to manage, direct, control, or otherwise facilitate transmitting a first message to a wireless communication device and receiving a second message responsive to the first message. The communications manager component 530 of some aspects may be capable of, configured to, or operable to manage, direct, control, or otherwise facilitate transmitting a subsequent transmission of the first communication session having one or more aspects of the transmission altered based on information regarding a co-existence condition.

Implementation examples are described in the following numbered clauses:

Clause 1. A method for wireless communication may provide for performing a first communication session with a wireless communication device and one or more second communication sessions in which a co-existence condition is experienced, where the co-existence condition is associated with interference at the apparatus, the interference being experienced due to the first communication session and the one or more second communication sessions, obtaining a first message from the wireless communication device, and outputting, for transmission, a second message responsive to the first message, where the second message carries information regarding the co-existence condition.

Clause 2. The method of clause 1, where the information regarding the co-existence condition indicates that the apparatus is experiencing the co-existence condition and further indicates whether the apparatus is able to obtain one or more additional packets from the wireless communication device while experiencing the co-existence condition.

Clause 3. The method of any of clauses 1 and 2, where the information regarding the co-existence condition includes information with respect to one or more parameters to be used by the wireless communication device for communicating with the apparatus.

Clause 4. The method of any of clauses 1-3, where the information regarding the co-existence condition indicates an expected duration of the co-existence condition.

Clause 5. The method of any of clauses 1-4, where the second message is an acknowledgment message carrying the information regarding the co-existence condition.

Clause 6. The method of clause 5, where the acknowledgement message includes a multi-station block acknowledgement (Multi-STA BA) message.

Clause 7. The method of clause 6, where at least one of an association identifier (AID), a traffic identifier (TID), or an acknowledgement type of the Multi-STA BA message is configured to provide at least a portion of the information regarding the co-existence condition.

Clause 8. The method of any of clauses 6 and 7, where a BA bitmap of the Multi-STA BA message is configured to provide at least a portion of the information regarding the co-existence condition.

Clause 9. The method of any of clauses 6-8, where one or more reserved bits in a BA control field of the Multi-STA BA message are configured to provide at least a portion of the information regarding the co-existence condition.

Clause 10. The method of clause 5, where the acknowledgement message includes a legacy acknowledgement message having one or more fields configured to carry the information regarding the co-existence condition.

Clause 11. An apparatus, including at least one memory including instructions; and one or more processors configured, individually or in any combination, to execute the instructions and cause the apparatus to perform a method in accordance with any one of clauses 1-10.

Clause 12. An apparatus, including means for performing a method in accordance with any one of clauses 1-10.

Clause 13. A non-transitory computer-readable medium including executable instructions that, when executed by one or more processors of an apparatus, cause the apparatus to perform a method in accordance with any one of clauses 1-10.

Clause 14. A computer program product embodied on a computer-readable storage medium including code for performing a method in accordance with any one of clauses 1-10.

Clause 15. A wireless communication device including at least one transceiver; at least one memory comprising instructions; and one or more processors configured, individually or in any combination, to execute the instructions and cause the AP to perform a method in accordance with any one of clauses 1-10, wherein the at least one transceiver is configured to perform a first communication session with a wireless communication device and one or more second communication sessions, to receive a first message from a second wireless communication device, and to transmit a second message responsive to the first message.

Clause 16. A Method for wireless communication may provide for outputting a first message for transmission to a wireless communication device, obtaining a second message responsive to the first message, where the second message carries information regarding a co-existence condition experienced by the wireless communication device, and where the co-existence condition is associated with interference at the wireless communication device, the interference being experienced due to a first communication session and one or more second communication sessions performed by the wireless communication device, and alter one or more aspects of a transmission associated with the first communication session based on the information regarding the co-existence condition.

Clause 17. The method of clause 16, where alternation of the one or more aspects includes altering one or more parameters to be used for transmission of a signal of the first communication session to the wireless communication device.

Clause 18. The method of any of clauses 16 and 17, where alteration of the one or more aspects includes pause from outputting of a signal of the first communication session for transmission to the wireless communication device.

Clause 19. The method of any of clauses 16-17, where the information regarding the co-existence condition indicates that the wireless communication device is experiencing the co-existence condition and further indicates whether the wireless communication device is able to receive additional packets from the apparatus while experiencing the co-existence condition.

Clause 20. The method of any of clauses 16-19, where the information regarding the co-existence condition indicates an expected duration of the co-existence condition.

Clause 21. The method of any of clauses 16-20, where the second message is an acknowledgment message carrying the information regarding the co-existence condition.

Clause 22. The method of clause 21, where the acknowledgment message includes a multi-station block acknowledgment (Multi-STA BA) message.

Clause 23. The method of clause 22, where at least one of an association identifier (AID), a traffic identifier (TID), or an acknowledgment type of the Multi-STA BA message is configured to provide at least a portion of the information regarding the co-existence condition.

Clause 24. The method of any of clauses 22 and 23, where a BA bitmap of the Multi-STA BA message is configured to provide at least a portion of the information regarding the co-existence condition.

Clause 25. The method of any of clauses 22-24, where one or more reserved bits in a BA control field of the Multi-STA BA message are configured to provide at least a portion of the information regarding the co-existence condition.

Clause 26. The method of clause 21, where the acknowledgment message includes a legacy acknowledgment having one or more fields configured to carry the information regarding the co-existence condition.

Clause 27. An apparatus, including at least one memory including instructions; and one or more processors configured, individually or in any combination, to execute the instructions and cause the apparatus to perform a method in accordance with any one of clauses 16-26.

Clause 28. An apparatus, including means for performing a method in accordance with any one of clauses 16-27.

Clause 29. A non-transitory computer-readable medium including executable instructions that, when executed by one or more processors of an apparatus, cause the apparatus to perform a method in accordance with any one of clauses 16-27.

Clause 30. A computer program product embodied on a computer-readable storage medium including code for performing a method in accordance with any one of clauses 16-27.

Clause 31. A wireless communication device including at least one transceiver; at least one memory comprising instructions; and one or more processors configured, individually or in any combination, to execute the instructions and cause the AP to perform a method in accordance with any one of clauses 16-27, wherein the at least one transceiver is configured to transmit a first message for transmission to a second wireless communication device, and to receive a second message responsive to the first message.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on." "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communication, comprising:
at least one transceiver;
a processing system that includes one or more processors and one or more memories with instructions therein, wherein the one or more processors are configured to execute the instructions to cause the apparatus to:
perform, via the at least one transceiver, a first communication session with a wireless communication device and one or more second communication sessions in which a co-existence condition is experienced, wherein the co-existence condition is associated with interference at the apparatus, the interference being experienced due to the first communication session and the one or more second communication sessions;
receive, from the wireless communication device via the at least one transceiver, a first message; and
transmit, via the at least one transceiver, a second message after receiving the first message, wherein the second message carries an acknowledgment frame comprising information regarding the co-existence condition, wherein the acknowledgement frame comprises a control field having one or more reserved bits configured to provide at least a portion of the information regarding the co-existence condition.

2. The apparatus of claim 1, wherein the information regarding the co-existence condition indicates that the apparatus is experiencing the co-existence condition and further indicates whether the apparatus is able to receive one or more additional packets from the wireless communication device while experiencing the co-existence condition.

3. The apparatus of claim 1, wherein the information regarding the co-existence condition includes information with respect to one or more parameters to be used by the wireless communication device for communicating with the apparatus.

4. The apparatus of claim 1, wherein the information regarding the co-existence condition indicates an expected duration of the co-existence condition.

5. The apparatus of claim 1, wherein the second message is an acknowledgment message carrying the information regarding the co-existence condition.

6. The apparatus of claim 5, wherein the acknowledgement message comprises a multi-station block acknowledgement (Multi-STA BA) message.

7. The apparatus of claim 6, wherein at least one of an association identifier (AID), a traffic identifier (TID), or an acknowledgement type of the Multi-STA BA message is configured to provide at least a portion of the information regarding the co-existence condition.

8. The apparatus of claim 6, wherein a BA bitmap of the Multi-STA BA message is configured to provide at least a portion of the information regarding the co-existence condition.

9. The apparatus of claim 6, wherein;
the control field is a BA control field of the Multi-STA BA message;
the one or more reserved bits are in the BA control field of the Multi-STA BA message.

10. The apparatus of claim 5, wherein the acknowledgement message comprises a legacy acknowledgement message having one or more fields configured to carry the information regarding the co-existence condition.

11. The apparatus of claim 1, wherein the apparatus is configured to operate as a wireless station (STA) or a wireless access point (AP).

12. An apparatus for wireless communication, comprising:
at least one transceiver;
a processing system that includes one or more processors and one or more memories with instructions therein, wherein the one or more processors are configured to execute the instructions to cause the apparatus to:
transmit, via the at least one transceiver, a first message for transmission to a wireless communication device;
receive, from the wireless communication device via the at least one transceiver, a second message after receiving the first message, wherein the second message carries an acknowledgment frame comprising information regarding a co-existence condition experienced by the wireless communication device, and wherein the co-existence condition is associated with interference at the wireless communication device, the interference being experienced due to a first communication session and one or more second communication sessions performed by the wireless communication device; and
alter one or more aspects of a transmission associated with the first communication session based on the information regarding the co-existence condition, wherein the acknowledgement frame comprises a control field having one or more reserved bits configured to provide at least a portion of the information regarding the co-existence condition.

13. The apparatus of claim 12, wherein alternation of the one or more aspects comprises altering one or more parameters to be used for transmission of a signal of the first communication session to the wireless communication device.

14. The apparatus of claim 12, wherein alteration of the one or more aspects comprises pause from transmitting of a signal of the first communication session for transmission to the wireless communication device.

15. The apparatus of claim 12, wherein the information regarding the co-existence condition indicates that the wireless communication device is experiencing the co-existence condition and further indicates whether the wireless communication device is able to receive additional packets from the apparatus while experiencing the co-existence condition.

16. The apparatus of claim 12, wherein the information regarding the co-existence condition indicates an expected duration of the co-existence condition.

17. The apparatus of claim 12, wherein the second message is an acknowledgment message carrying the information regarding the co-existence condition.

18. The apparatus of claim 17, wherein the acknowledgment message comprises a multi-station block acknowledgment (Multi-STA BA) message.

19. The apparatus of claim 18, wherein at least one of an association identifier (AID), a traffic identifier (TID), or an acknowledgment type of the Multi-STA BA message is configured to provide at least a portion of the information regarding the co-existence condition.

20. The apparatus of claim 18, wherein a BA bitmap of the Multi-STA BA message is configured to provide at least a portion of the information regarding the co-existence condition.

21. The apparatus of claim 18, wherein:

the control field is a BA control field of the Multi-STA BA message;

the one or more reserved bits are in the BA control field of the Multi-STA BA message.

22. The apparatus of claim 17, wherein the acknowledgment message comprises a legacy acknowledgment having one or more fields configured to carry the information regarding the co-existence condition.

23. The apparatus of claim 12, wherein the apparatus is configured as a wireless station (STA) or a wireless access point (AP).

24. A method for wireless communication performable by a first wireless communication device, comprising:

performing a first communication session with a second wireless communication device and one or more second communication sessions in which a co-existence condition is experienced, wherein the co-existence condition is associated with interference at the first wireless communication device, the interference being experienced due to the first communication session and the one or more second communication sessions;

receiving a first message from the second wireless communication device; and transmitting a second message after receiving the first message, wherein the second message carries an acknowledgment frame comprising information regarding the co-existence condition, wherein the acknowledgement frame comprises a control field having one or more reserved bits configured to provide at least a portion of the information regarding the co-existence condition.

* * * * *